United States Patent
Zhang

(10) Patent No.: US 10,017,353 B1
(45) Date of Patent: Jul. 10, 2018

(54) ELECTRICAL CABLE REEL MODULE FOR A DRONE

(71) Applicant: Aaron Zhang, Allendale, NJ (US)

(72) Inventor: Aaron Zhang, Allendale, NJ (US)

( * ) Notice: Subject to any disclaimer, the term of this patent is extended or adjusted under 35 U.S.C. 154(b) by 0 days.

(21) Appl. No.: 15/784,865

(22) Filed: Oct. 16, 2017

(30) Foreign Application Priority Data

Apr. 21, 2017 (CN) .................... 2017 2 0425149 U

(51) Int. Cl.
*H02G 11/00* (2006.01)
*B65H 75/44* (2006.01)
*H02G 11/02* (2006.01)
*B64C 39/02* (2006.01)

(52) U.S. Cl.
CPC ....... *B65H 75/4481* (2013.01); *B64C 39/022* (2013.01); *H02G 11/02* (2013.01); *B64C 39/024* (2013.01); *B64C 2201/042* (2013.01); *B64C 2201/128* (2013.01); *B65H 2701/34* (2013.01)

(58) Field of Classification Search
CPC ............ B65H 75/4481; B65H 2701/34; B64C 39/022; B64C 39/024; B64C 39/028; B64C 2201/042; B64C 2201/128; H02G 11/02
See application file for complete search history.

(56) References Cited

U.S. PATENT DOCUMENTS

| | | | | |
|---|---|---|---|---|
| 2,735,005 A | * | 2/1956 | Steele | ............ H03K 23/82 377/125 |
| 2013/0299103 A1 | * | 11/2013 | Anderson | ............ E06B 9/24 160/331 |
| 2014/0083631 A1 | * | 3/2014 | Huang | ............ E06B 9/322 160/170 |
| 2015/0136336 A1 | * | 5/2015 | Huang | ............ E06B 9/322 160/170 |
| 2017/0088259 A1 | * | 3/2017 | Chubb | ............ B64C 39/022 |
| 2017/0144754 A1 | * | 5/2017 | Limvorapun | ............ B64C 39/022 |
| 2017/0240277 A1 | * | 8/2017 | Molnar | ............ B64C 39/022 |

* cited by examiner

*Primary Examiner* — Jason C Smith
(74) *Attorney, Agent, or Firm* — Wang Law Firm, Inc.

(57) ABSTRACT

An electrical cable reel module for a drone includes a bracket adapted to be firmly fixed to the drone. A reel body is movably and rotatably mounted on the bracket. A first driving device is mounted on one side of the bracket to drive the reel body to rotate and a second driving device is mounted on the other side of the bracket to drive the reel body to move linearly in a first direction. A third driving device is mounted on the bracket to drive the reel body to move linearly in a second direction opposite to that of the first direction. At least one positioning device is mounted among the reel body, the first driving device and the second driving device to selectively drive the reel body to rotate and prevent the reel body from movement and rotation.

17 Claims, 7 Drawing Sheets

ELECTRICAL CABLE REEL MODULE FOR A DRONE

TECHNICAL FIELD

The preferred embodiment of the present invention is related to the field of an electrical cable reel and, more particularly, to an electrical cable reel module for a drone.

BACKGROUND OF THE INVENTION

Applications of drones regardless of their sizes and structures have been widely promoted to an unprecedented record ever since the drone was introduced to the market, such as entertainment, surveillance, transportation . . . etc. As its compact size, little electricity consumption, and maneuverability in all terrains, drones or UAVs (unmanned aerial vehicle) are popular in all fields. Among these various applications, the most widely used is the ability to carry load from places to places. Currently, most drones used in cargo transportation adopts an electrical reel powered by a motor to extend or retract cables mounted around the electrical reel. One very common situation is when the drone is transporting a cargo from place A to place B, which is that the motor has a malfunction to either extend or retract the cable. When the motor is not working properly and the cargo is not able to be delivered to the designated recipient, problems arise. Besides, often in time, when the drone is carrying its mission unloading the cargo by extending down the cable, unidentified personnel may grab the cable and steal the entire drone as the cable is securely connected to the drone.

In order to obviate or mitigate the problem, it is an objective of the present invention to provide an electrical reel module for a drone to protect the safety of the drone and still can carry out its designated task in a more energy and time efficient manner.

SUMMARY OF THE INVENTION

It is an objective of the preferred embodiment of the present invention to provide an electrical cable reel module for a drone, which has a bracket adapted to be firmly fixed to the drone; a reel body movably and rotatably mounted on the bracket; a first driving device mounted on one side of the bracket to drive the reel body to rotate; a second driving device mounted on the other side of the bracket to drive the reel body to move linearly in a first direction; a third driving device mounted on the bracket and close to the first driving device to drive the reel body to move linearly in a second direction opposite to that of the first direction; and at least one positioning device mounted among the reel body, the first driving device and the second driving device to selectively drive the reel body to rotate and prevent the reel body from movement and rotation.

Another objective of the preferred embodiment of the present invention is that the reel body has two axes respectively and selectively connected to the first driving device and the second driving device so that the first driving device is able to drive the reel body to rotate and the second driving device is able to drive the reel body to move.

Another objective of the preferred embodiment of the present invention is that the reel body has a through hole defined therethrough for receiving freely a free end of a cable therein.

Another objective of the preferred embodiment of the present invention is that the at least one positioning device includes a first positioning device mounted between the reel body and the second driving device to selectively secure the reel body from movement and rotation and a second positioning device mounted between the reel body and the first driving device to selectively secure the reel body from rotation.

Another objective of the preferred embodiment of the present invention is that the reel body has a first axis extending toward the first driving device and a second axis oppositely extending relative to the first axis and toward the second driving device.

Another objective of the preferred embodiment of the present invention is that the reel body has a first axis extending toward the first driving device and a second axis oppositely extending relative to the first axis and toward the second driving device, the first positioning device includes a first block formed on the second axis and a first blind hole defined in a side of the bracket in such a way that after the first block is extended into the first blind hole the reel body is securely fixed relative to the first driving device and the second driving device.

Another objective of the preferred embodiment of the present invention is that the reel body has a first axis extending toward the first driving device and a second axis oppositely extending relative to the first axis and toward the second driving device, the second positioning device includes a second block formed on the first axis of the reel body and a second blind hole defined in an axle of the first driving device in such a way that after the second block is extended into the second blind hole the reel body is immovable relative to the first driving device.

Another objective of the preferred embodiment of the present invention is that the reel body has a first axis extending toward the first driving device and a second axis oppositely extending relative to the first axis and toward the second driving device, the first positioning device includes a first block formed on the second axis and a first blind hole defined in a side of the bracket in such a way that after the first block is extended into the first blind hole, the reel body is immovable relative to the first driving device as well as the second driving device.

Another objective of the preferred embodiment of the present invention is that the third driving device is a recoil spring providing a force in a direction opposite to that of the second driving device.

Another objective of the preferred embodiment of the present invention is that the bracket includes a bottom plate and two side plates respectively formed on two opposed sides of the bottom plate, the first driving device is fixed to one side plate of the bracket and includes a motor and an axle extending out from the motor and selectively connecting to a free end of the first axis of the reel body to drive the first axis to rotate, the second driving device is fixed to the other side plate of the bracket and includes a second motor and a driving board driven by the second motor to rotate and provided with at least three sides of different lengths to allow the reel body to respectively be driven by the first driving device to rotate, freely rotated without any restriction and immovable relative to both the first driving device and the second driving device.

DETAILED DESCRIPTION OF THE PREFERRED EMBODIMENT

Figure 1:
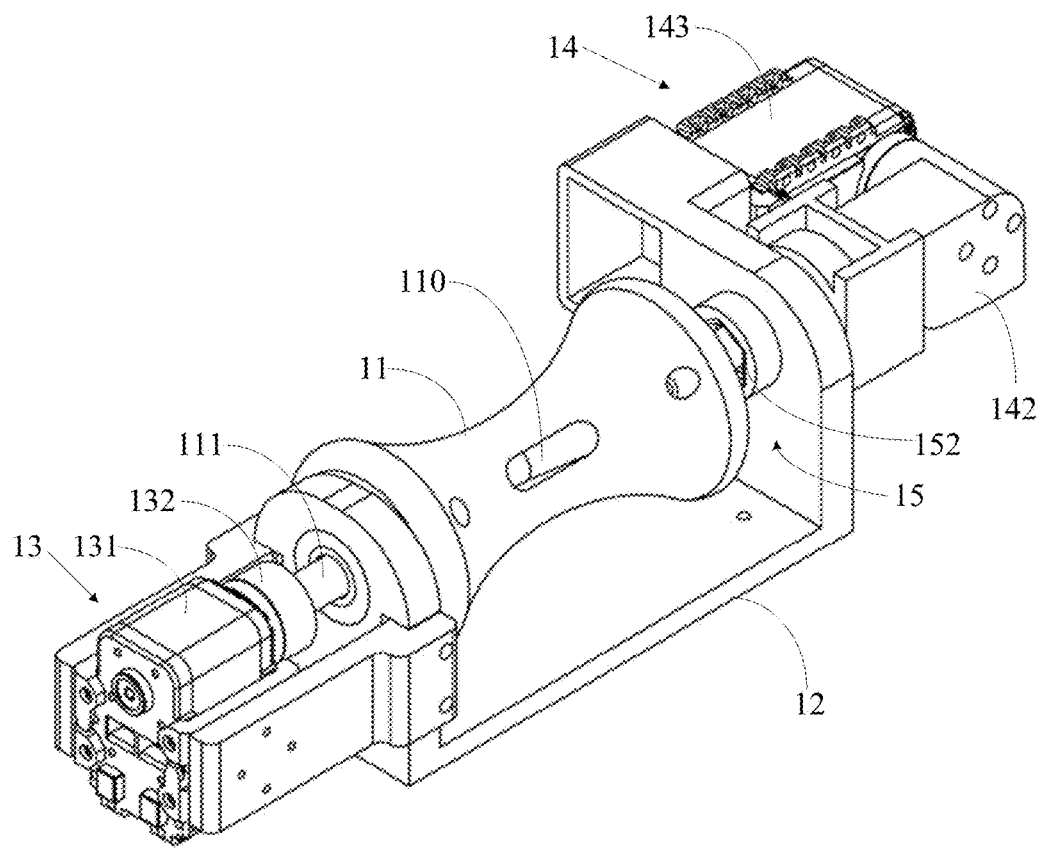
FIG. 1 is a perspective view of a preferred embodiment of the electrical cable reel module of the present invention.

Preferred embodiment(s) of the present invention in combination with the attached drawings shall be provided in detail in the following description. However, the given description is for example purpose only and should not be deemed as a limiting to the scope of the present invention in any way.

In order to make it easy to carry out the preferred embodiment of the present invention, a detailed description of the parts of the invention, supported with figures is provided here. As each part of the preferred embodiment of the present invention has many features, it is made easy to read, by referring to each feature with a number included in the parts description text. The number of the parts feature(s) is indicated here by starting it sequentially from the number 11, wherever a part feature appears in a text, an associated serial number is directly assigned.

With reference to FIGS. 1 to 4, the electrical cable reel module constructed in accordance with the preferred embodiment of the present invention includes a saddle-like reel body 11 having a through hole 110 extending through the reel body 11 longitudinally or latitudinally with respect to the reel body 11, a first axis 111 and a second axis 112 respectively and oppositely extending from two opposed ends of the reel body 11, a bracket 12 having the reel body 11 securely yet movably and rotatably mounted thereon, a first driving device 13 securely connected to a side of the bracket 12, a second driving device 14 securely connected to the bracket 12 and located at a position opposite to the first driving device 13 to move the reel body 11, a first positioning device 15 provided on the bracket 12 to secure position of the reel body 11, a second positioning device 16 oppositely provided relative to the first positioning device 15 on the bracket 12 also to secure position of the reel body 11 and a third driving device 17 providing a force opposite to that of the second driving device 16.

As shown especially in FIG. 1, the through hole 110 in the reel body 11 is, for example, latitudinally defined along a latitudinal axis of the reel body 11. The purpose of having this through hole 110 is that the operator may extend one free end of cable through the through hole 110 and then directly mount the rest of the cable around the reel body 11 to use the weight of the cable itself to secure the free end of the cable in the through hole 110. Using the cable friction itself to secure the cable free end inside the through hole 110 prevents any unidentified personnel from grabbing the descending cable and stealing the drone when the drone is unloading at a designated location.

The bracket 12 is generally U shaped and has a bottom plate 121 and two opposed side plates 122 mounted on two opposite sides of the bottom plate 121 and respectively having a structure formed on an appropriate location on a side face of each of the side plates 122 to rotatably receive therein the first axis 111 and the second axis 112. As defining a receiving hole in a side face of the side plate 122 is conventional in the art, there will be no detailed description targeting the specific location and the shape of the receiving hole on the side face of each of the side plates 122.

The first driving device 13 includes a motor 131 and an axel 132 driven by the motor 131 and one free end of which may be directly or indirectly connected to a free end of the first axis 111 of the reel body 11 so that the reel body 11 is rotatably connected to the first driving device 13. A detailed description will be given regarding the second driving device 14 when the second driving device 14 is in use.

Figure 5:
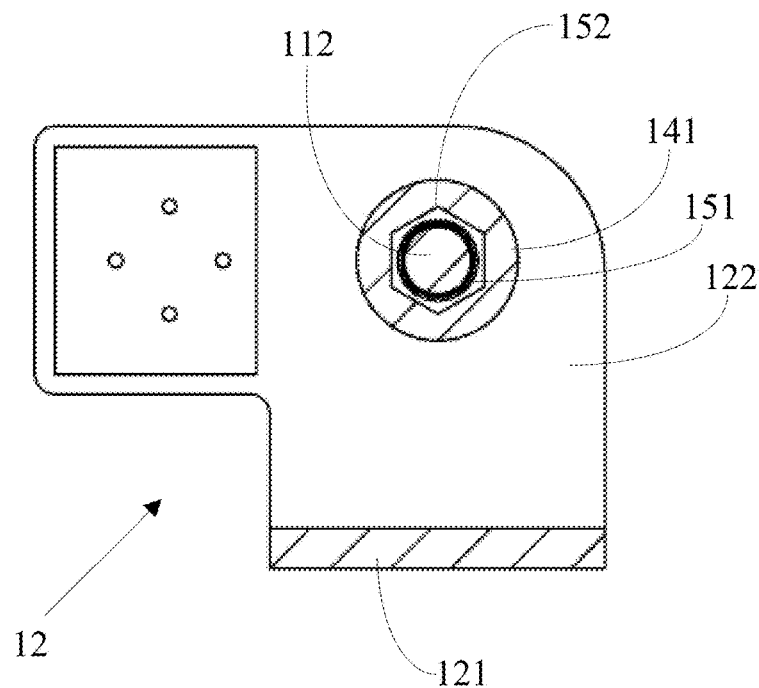
FIG. 5 is a cross-sectional view taken from line B-B of FIG. 4.

The first positioning device 15 includes a first block 151 firmly formed on an outer periphery of the second axis 112 of the reel body 11 and a first blind hole 152 defined in the side face of the side plate 122 adjacent to the second axis 112, where the second axis 112 extends into the side plate 122. The first block 151 has a first geometric shape corresponding to that of the first blind hole 152 and the first blind hole 152 has a dimension allowing the first block 151 to fit into the first blind hole 152 snugly. The first geometric shape may be rectangular, triangular, hexagonal or any suitable shape allowing the first block 151 to be fixed inside the first blind hole 152 once the first block 151 is extended into the first blind hole 152, as shown in FIG. 5. Because the first block 151 is firmly formed around the second axis 112 of the reel body 11, after the first block 151 is positioned inside the first blind hole 152, the reel body 11 is stopped from rotation.

Figure 3:
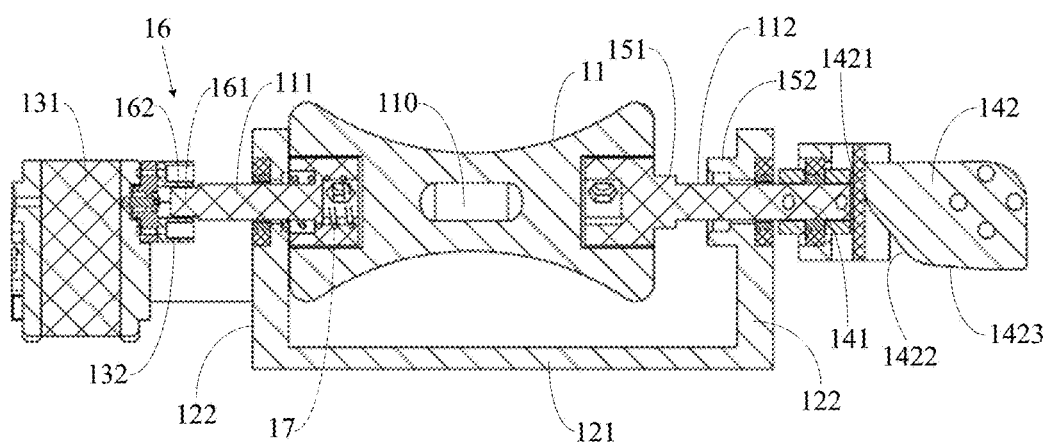
FIG. 3 a cross-sectional view showing the electrical cable reel module of the preferred embodiment of the present invention.
Figure 4:
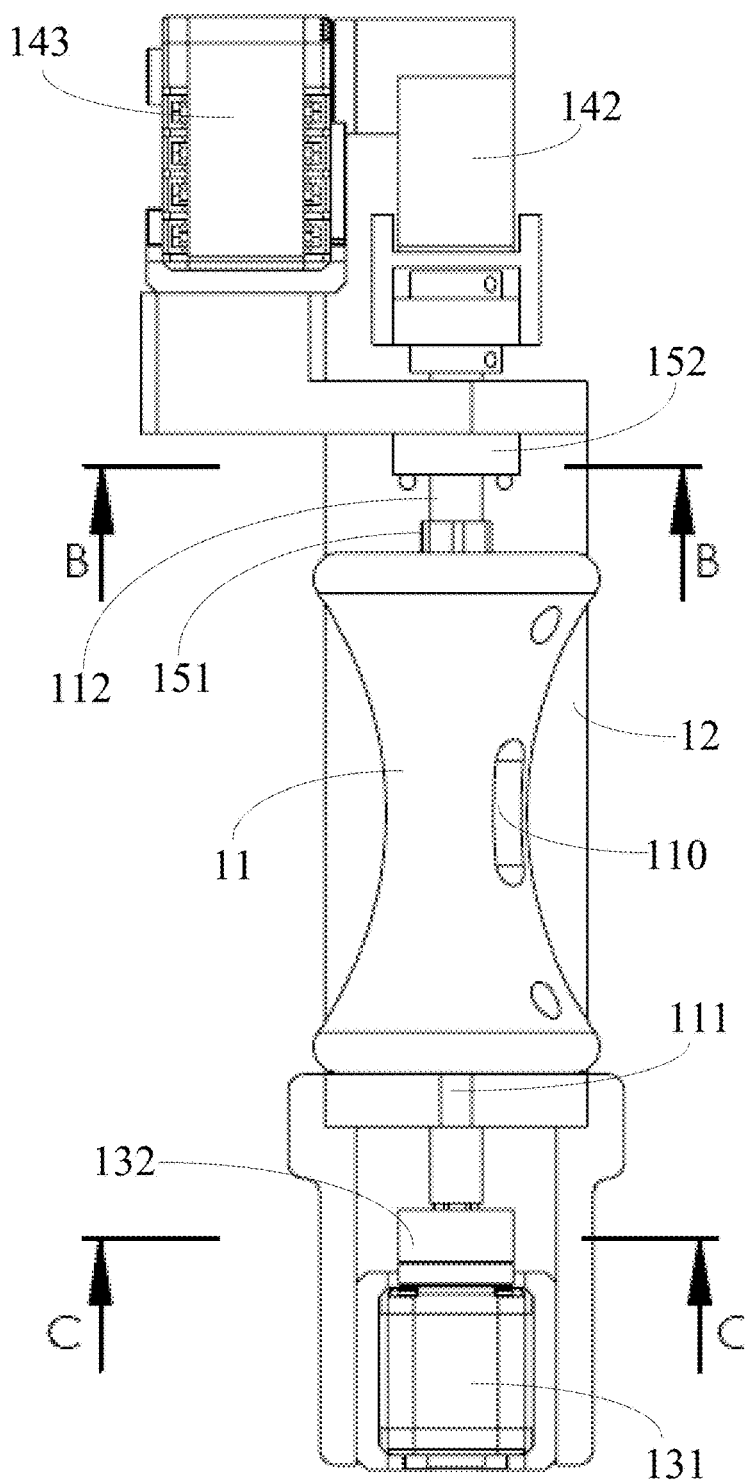
FIG. 4 is a top plan view of the electrical cable reel module of the preferred embodiment of the present invention.
Figure 6:
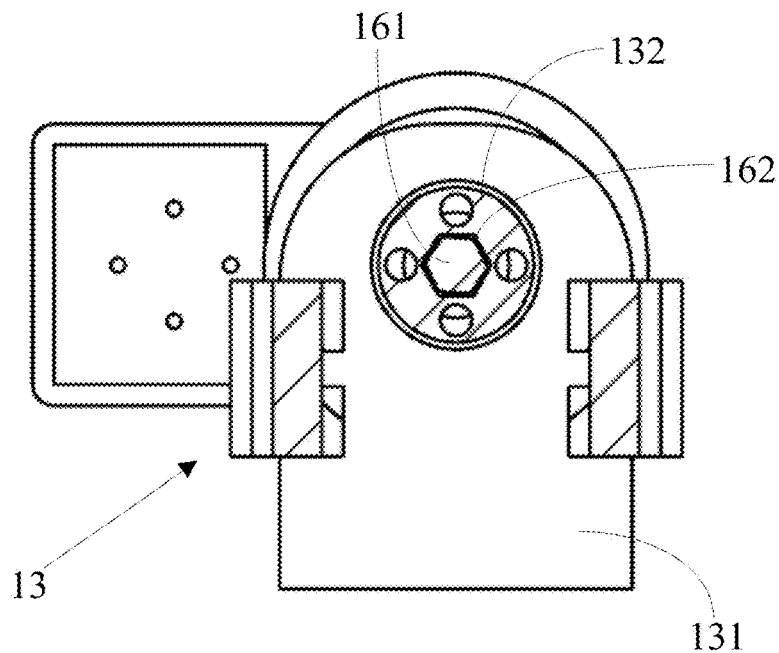
FIG. 6 is a cross-sectional view taken from line C-C of FIG. 4.

The second positioning device 16 is provided close to the first driving device 13 as shown in FIG. 3 and has a second block 161 firmly mounted around the first axis 111 of the reel body 11 and a second blind hole 162 defined in an appropriate location in the axel 132 of the first driving device 13. The second block 161 has a second geometric shape which may or may not be the same as that of the first geometric shape of the first block 151 of the first positioning device 15. The second blind hole 162 has a dimension allowing the second block 161 to fit into the second blind hole 162 snugly. The second geometric shape may be rectangular, triangular, hexagonal or any suitable shape allowing the second block 161 to be fixed inside the second blind hole 162 once the first block 161 is extended into the second blind hole 162, as shown in FIG. 6. Because the second block 161 is firmly formed around the first axis 111 of the reel body 11, after the second block 161 is positioned inside the second blind hole 162, the reel body 11 is stopped from rotation.

The third driving device 17 is provided between the reel body 11 and one of the side plates 122 of the bracket 12. As depicted in FIG. 3, the third driving device 17 is provided between the reel body 11 and the side plate 122 close to the second positioning device 16 and is a recoil spring one free end of which is received inside the reel body 11 and the other free end of which is abutted against a side face of the side plate 122.

Referring to FIG. 3, the second driving device 14 includes a push board 141 one free side of which is securely engaged with a free end of the second axis 112 of the reel body 11, a driving board 142 securely engaged with the other free side of the push board 141 and a second motor 143 operably connected to the driving board 142 to drive the driving board 142 to rotate. It is noted that the driving board 142 is eccentrically connected to the second motor 143 and functions like a cam and thus has three sides, i.e., a first side 1421, a second side 1422 and a third side 1423, wherein the second side 1422 is sandwiched between the first side 1421 and the third side 1423. The one side of the push board 141 may be directly and firmly engaged with the second axis 112 of the reel body 11 or indirectly engaged with the second axis 112 of the reel body 11. A first distance from the first side 1421 to a rotation center of the driving board 142 is larger than a second distance from the second side 1422 to the rotation center of the driving board 142 and the second distance is larger than a third distance from the third side 1423 to the rotation center. From the depictions of FIG. 3, FIG. 9 and FIG. 12 respectively, the reel body 11 is located at three different positions, e.g., a first locking position, a free rotation position and a second locking position.

Figure 2:
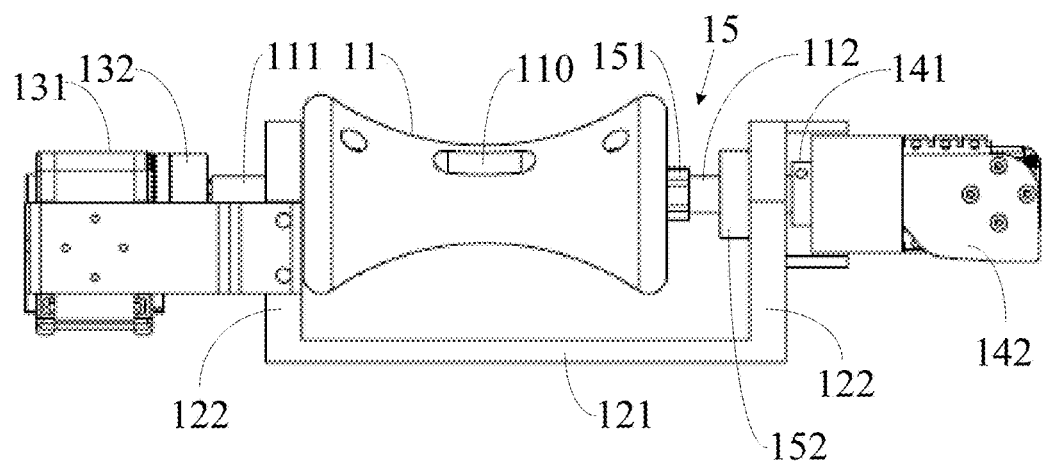
FIG. 2 is a side view of the electrical cable reel module shown in FIG. 1.

With reference to FIGS. 1-3, when the second motor 143 is in operation to drive the driving board 142 to rotate, which allows the first side 1421 to abut a side face of the push board 142 to push the reel body 11 to move in a first direction. When the reel body 11 moves, the second block 161 gradually moves into the second blind hole 162 and eventually lock the reel body 11 from further movement or any rotation. While the reel body 11 is at this position, the operator may operate the reel body 11 to retrieve the cable already extended outward.

Figure 7:
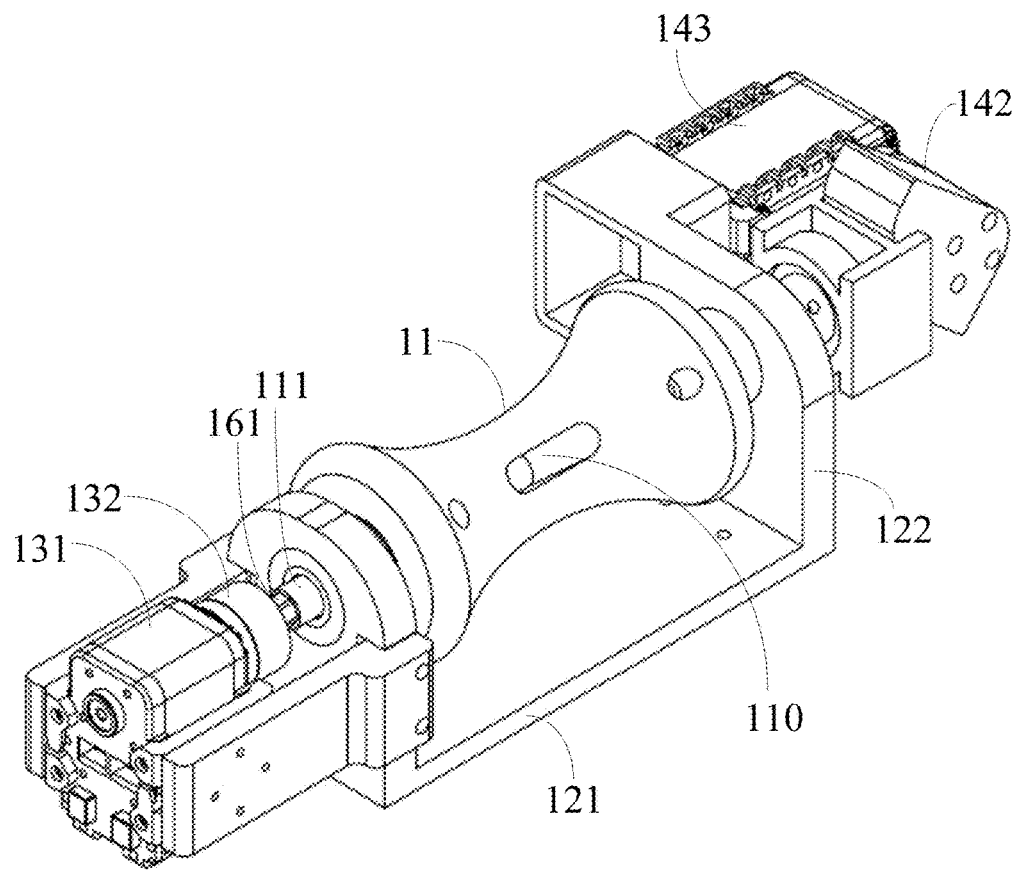
FIG. 7 is a perspective view showing that the reel body of the electrical cable reel module of the preferred embodiment of the present invention is in a free rotation status.
Figure 8:
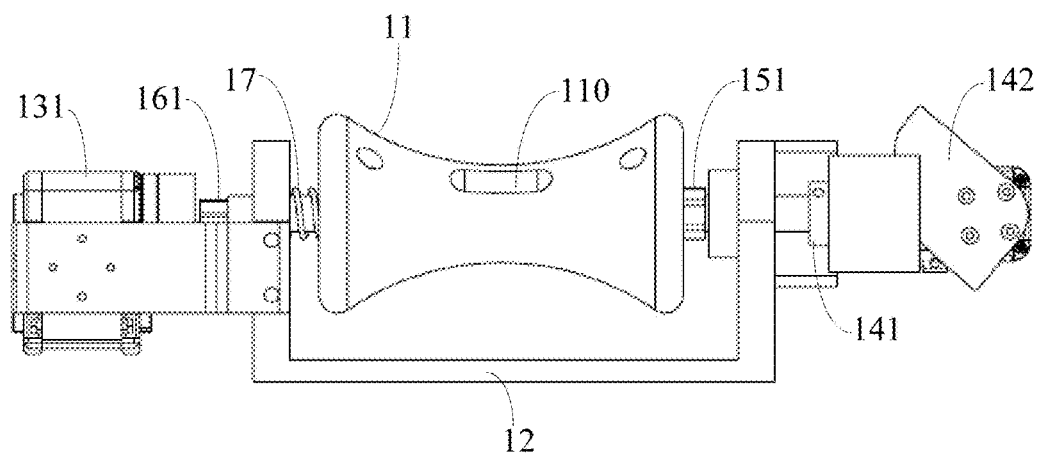
FIG. 8 is a side plan view showing that the reel body of the electrical cable reel module of the preferred embodiment of the present invention is in a free rotation status.
Figure 9:
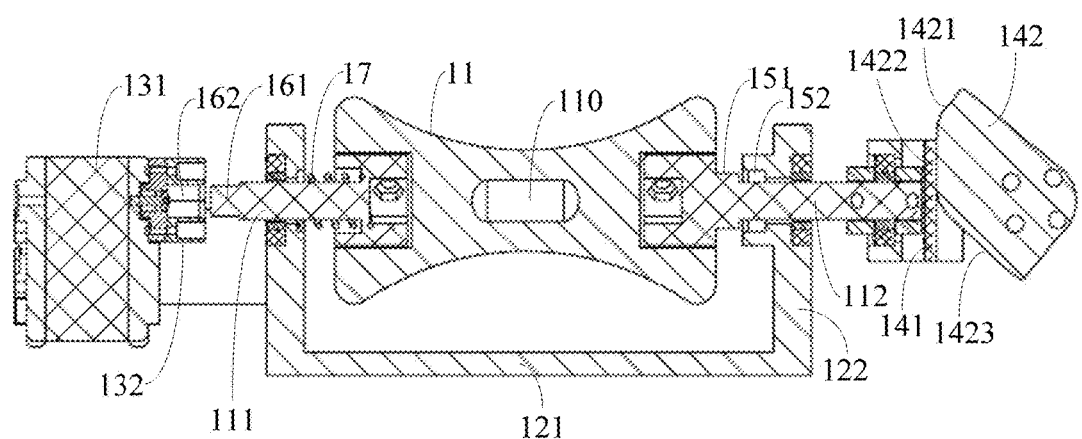
FIG. 9 is a cross-sectional view showing that the reel body of the electrical cable reel module of the preferred embodiment of the present invention is in a free rotation status.

With reference to FIGS. 7-9, when the second side 1422 is pushing the push board 141 while the third driving device 17 releases a recoil force to push the reel body 11 away from the first driving device 13, neither the first block 151 nor the second block 161 is received in the corresponding first blind hole 152 or the second blind hole 162, the reel body 11 is in free rotation. Thus, with the weight of the cargo as well as the cable weight, the cable extends freely and the cargo is delivered to the designated location. After the cargo is delivered, the first side 1421 engages with the push board 141 to allow the second block 161 to be received in the second blind hole 162 to therefore lock the reel body 11. Then, rotation of axle 132 drives the reel body 11 to retrieve the extended cable.

Figure 10:
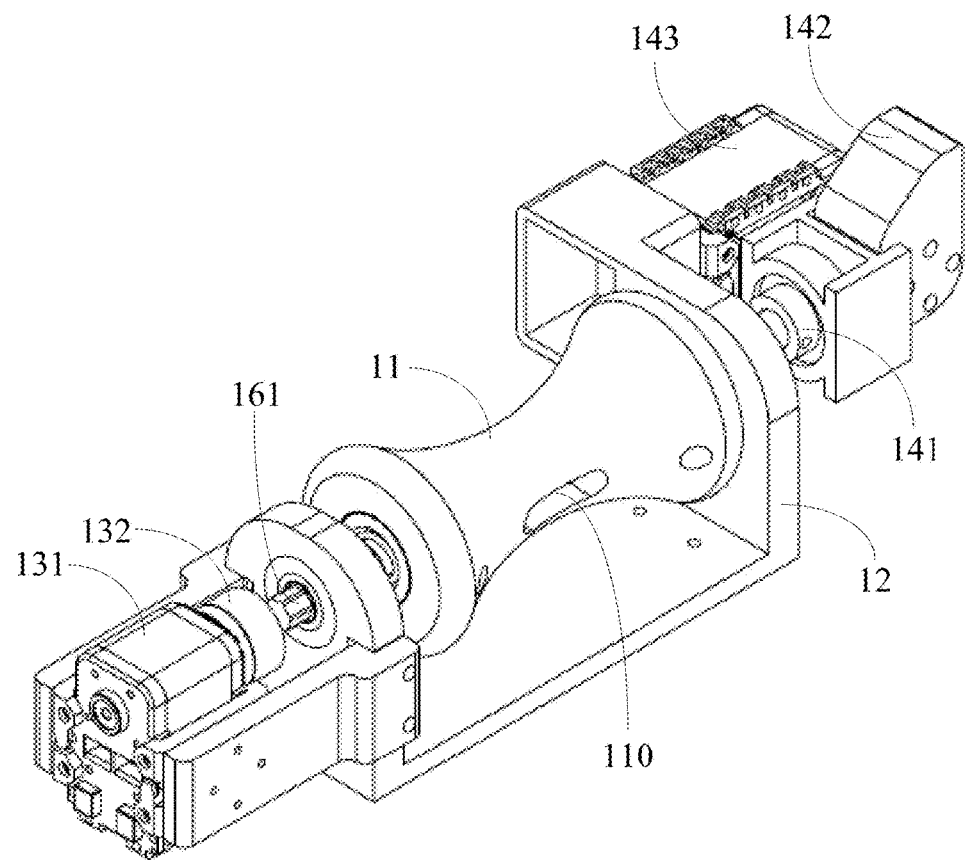
FIG. 10 is a perspective view showing that the reel body of the electrical cable reel module of the preferred embodiment of the present invention is in a locked status.
Figure 11:
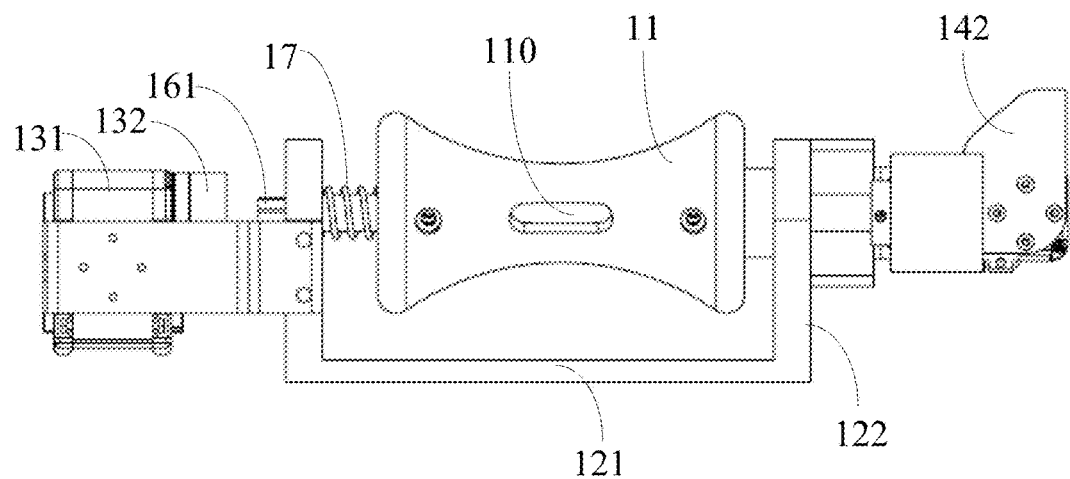
FIG. 11 is a side plan view showing that the reel body of the electrical cable reel module of the preferred embodiment of the present invention is in a locked status.
Figure 12:
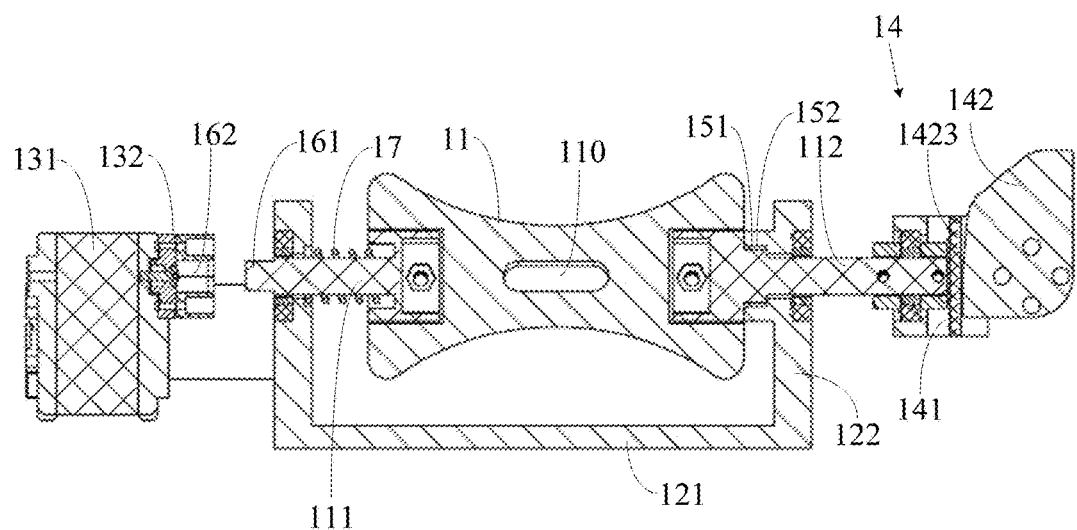
FIG. 12 is a cross-sectional view showing that the reel body of the electrical cable reel module of the preferred embodiment of the present invention is in a locked status.

With reference to FIGS. 10-12, after the extended cable is fully retrieved, the third side 1423 of the driving board 142 engages the push board 141 while the third driving device 17 releases a certain amount of recoil force to move the reel body 11 to allow the first block 151 to be received inside the first blind hole 152 and to allow the second block 161 to leave the second blind hole 162. When the first block 151 is received inside the first blind hole 152, the second block 161 leaves the second blind hole 162 and the reel body 11 is firmly secured to the bracket 12. In this status, the drone is able to fly freely with or without the cargo.

From the description above, it is noted that the operator is able to control the drone to extend the cable simply by the weight of the cargo and of the cable itself once the drone reaches the designated destination. Yet, due to the through hole design in the reel body 11, any unidentified personnel may take the opportunity to grab the extended cable and steal the drone if the cable is securely attached to the drone in the conventional manner. However, because the free end on the reel body 11 is secured only by the weight of the cable itself, even some unauthorized personnel grabs the extended cable while the drone is dropping the cargo, as the cable is not tied firmly to the reel body or any part of the drone, the drone can fly away freely.

After a detailed description of the preferred embodiment(s) has been provided, any skilled person in the art would easily understand the description so provided is for example purpose only. The scope for protection of the present invention is defined by the attached claims. Any skilled person in the art would easily amend, modify or alter the elements/devices of the present invention without departing from the principle essence and spirit of the present invention. However, the amendment, modification or alteration shall fall within the protection scope sought of the present invention.

What is claimed is:

1. An electrical cable reel module for a drone, the electrical cable reel comprising:
   a bracket adapted to be firmly fixed to the drone;
   a reel body movably and rotatably mounted on the bracket;
   a first driving device mounted on one side of the bracket to drive the reel body to rotate;
   a second driving device mounted on the other side of the bracket to drive the reel body to move linearly in a first direction;
   a third driving device mounted on the bracket and close to the first driving device to drive the reel body to move linearly in a second direction opposite to that of the first direction; and
   at least one positioning device mounted among the reel body, the first driving device and the second driving device to selectively drive the reel body to rotate and prevent the reel body from movement and rotation,
   wherein the reel body has two axes respectively and selectively connected to the first driving device and the second driving device so that the first driving device is able to drive the reel body to rotate and the second driving device is able to drive the reel body to move;
   the reel body has a first axis extending toward the first driving device and a second axis oppositely extending relative to the first axis and toward the second driving device
   the bracket includes a bottom plate and two side plates respectively formed on two opposed sides of the bottom plate,
   the first driving device is fixed to one side plate of the bracket and includes a motor and an axle extending out from the motor and selectively connecting to a free end of the first axis of the reel body to drive the first axis to rotate;
   the second driving device is fixed to the other side plate of the bracket and includes a second motor and a driving board driven by the second motor to rotate and provided with at least three sides of different lengths to allow the reel body to respectively be driven by the first driving device to rotate, freely rotated without any restriction and immovable relative to both the first driving device and the second driving device.

2. The electrical cable reel module as claimed in claim 1, wherein the reel body has a through hole defined therethrough for receiving freely a free end of a cable therein.

3. The electrical cable reel module as claimed in claim 1, wherein the at least one positioning device includes a first positioning device mounted between the reel body and the second driving device to selectively secure the reel body from movement and rotation and a second positioning device mounted between the reel body and the first driving device to selectively secure the reel body from rotation.

4. The electrical cable reel module as claimed in claim 3, wherein the reel body has a first axis extending toward the first driving device and a second axis oppositely extending relative to the first axis and toward the second driving device,
the first positioning device includes a first block formed on the second axis and a first blind hole defined in a side of the bracket in such a way that after the first block is extended into the first blind hole the reel body is securely fixed relative to the first driving device and the second driving device.

5. The electrical cable reel module as claimed in claim 3, wherein the reel body has a first axis extending toward the first driving device and a second axis oppositely extending relative to the first axis and toward the second driving device,
the second positioning device includes a second block formed on the first axis of the reel body and a second blind hole defined in an axle of the first driving device in such a way that after the second block is extended into the second blind hole the reel body is immovable relative to the first driving device.

6. The electrical cable reel module as claimed in claim 5, wherein the reel body has a first axis extending toward the first driving device and a second axis oppositely extending relative to the first axis and toward the second driving device,
the first positioning device includes a first block formed on the second axis and a first blind hole defined in a side of the bracket in such a way that after the first block is extended into the first blind hole, the reel body is immovable relative to the first driving device as well as the second driving device.

7. The electrical cable reel module as claimed in claim 1, wherein the third driving device is a recoil spring providing a force in a direction opposite to that of the second driving device.

8. The electrical cable reel module as claimed in claim 3, wherein the third driving device is a recoil spring providing a force in a direction opposite to that of the second driving device.

9. The electrical cable reel module as claimed in claim 1, wherein the third driving device is a recoil spring providing a force in a direction opposite to that of the second driving device.

10. The electrical cable reel module as claimed in claim 4, wherein the third driving device is a recoil spring providing a force in a direction opposite to that of the second driving device.

11. The electrical cable reel module as claimed in claim 5, wherein the third driving device is a recoil spring providing a force in a direction opposite to that of the second driving device.

12. The electrical cable reel module as claimed in claim 6, wherein the third driving device is a recoil spring providing a force in a direction opposite to that of the second driving device.

13. The electrical cable reel module as claimed in claim 4, wherein the bracket includes a bottom plate and two side plates respectively formed on two opposed sides of the bottom plate,
the first driving device is fixed to one side plate of the bracket and includes a motor and an axle extending out from the motor and selectively connecting to a free end of the first axis of the reel body to drive the first axis to rotate;
the second driving device is fixed to the other side plate of the bracket and includes a second motor and a driving board driven by the second motor to rotate and provided with at least three sides of different lengths to allow the reel body to respectively be driven by the first driving device to rotate, freely rotated without any restriction and immovable relative to both the first driving device and the second driving device.

14. The electrical cable reel module as claimed in claim 5, wherein the bracket includes a bottom plate and two side plates respectively formed on two opposed sides of the bottom plate,
the first driving device is fixed to one side plate of the bracket and includes a motor and an axle extending out from the motor and selectively connecting to a free end of the first axis of the reel body to drive the first axis to rotate;
the second driving device is fixed to the other side plate of the bracket and includes a second motor and a driving board driven by the second motor to rotate and provided with at least three sides of different lengths to allow the reel body to respectively be driven by the first driving device to rotate, freely rotated without any restriction and immovable relative to both the first driving device and the second driving device.

15. The electrical cable reel module as claimed in claim 6, wherein the bracket includes a bottom plate and two side plates respectively formed on two opposed sides of the bottom plate,
the first driving device is fixed to one side plate of the bracket and includes a motor and an axle extending out from the motor and selectively connecting to a free end of the first axis of the reel body to drive the first axis to rotate;
the second driving device is fixed to the other side plate of the bracket and includes a second motor and a driving board driven by the second motor to rotate and provided with at least three sides of different lengths to allow the reel body to respectively be driven by the first driving device to rotate, freely rotated without any restriction and immovable relative to both the first driving device and the second driving device.

16. The electrical cable reel module as claimed in claim 7, wherein the bracket includes a bottom plate and two side plates respectively formed on two opposed sides of the bottom plate,
the first driving device is fixed to one side plate of the bracket and includes a motor and an axle extending out from the motor and selectively connecting to a free end of the first axis of the reel body to drive the first axis to rotate;
the second driving device is fixed to the other side plate of the bracket and includes a second motor and a driving board driven by the second motor to rotate and provided with at least three sides of different lengths to allow the reel body to respectively be driven by the first driving device to rotate, freely rotated without any restriction and immovable relative to both the first driving device and the second driving device.

17. The electrical cable reel module as claimed in claim 8, wherein the bracket includes a bottom plate and two side plates respectively formed on two opposed sides of the bottom plate, the first driving device is fixed to one side plate of the bracket and includes a motor and an axle extending out from the motor and selectively connecting to a free end of the first axis of the reel body to drive the first axis to rotate;

the second driving device is fixed to the other side plate of the bracket and includes a second motor and a driving board driven by the second motor to rotate and provided with at least three sides of different lengths to allow the reel body to respectively be driven by the first driving device to rotate, freely rotated without any restriction and immovable relative to both the first driving device and the second driving device.

\* \* \* \* \*